Sept. 20, 1932.    A. R. THOMPSON    1,878,025
COMBINED COOKER AND COOLER
Filed April 18, 1928    5 Sheets-Sheet 2
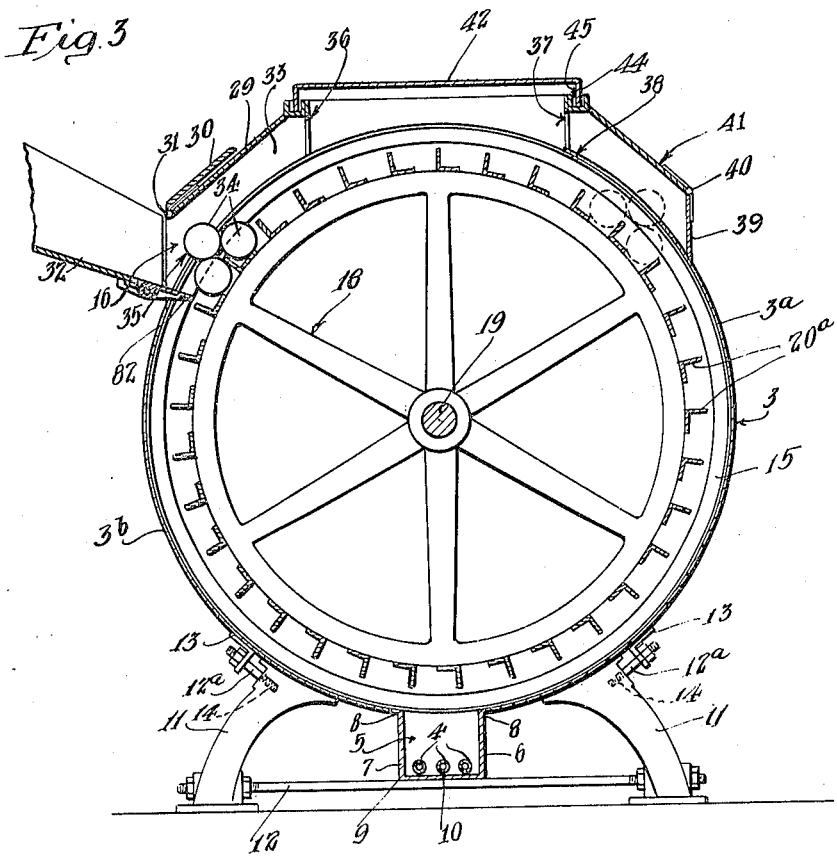
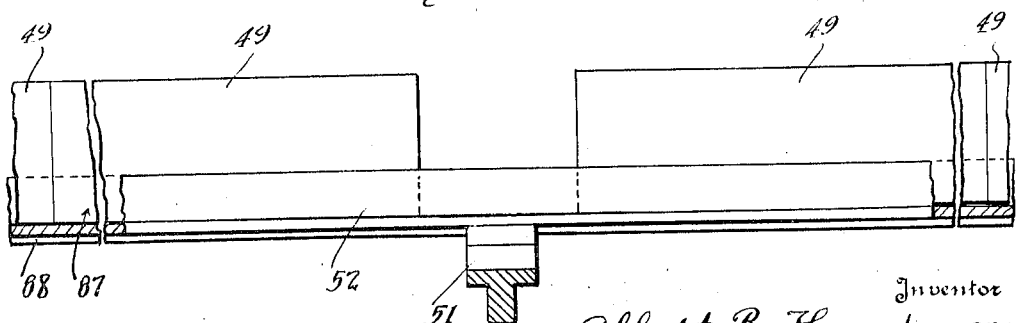

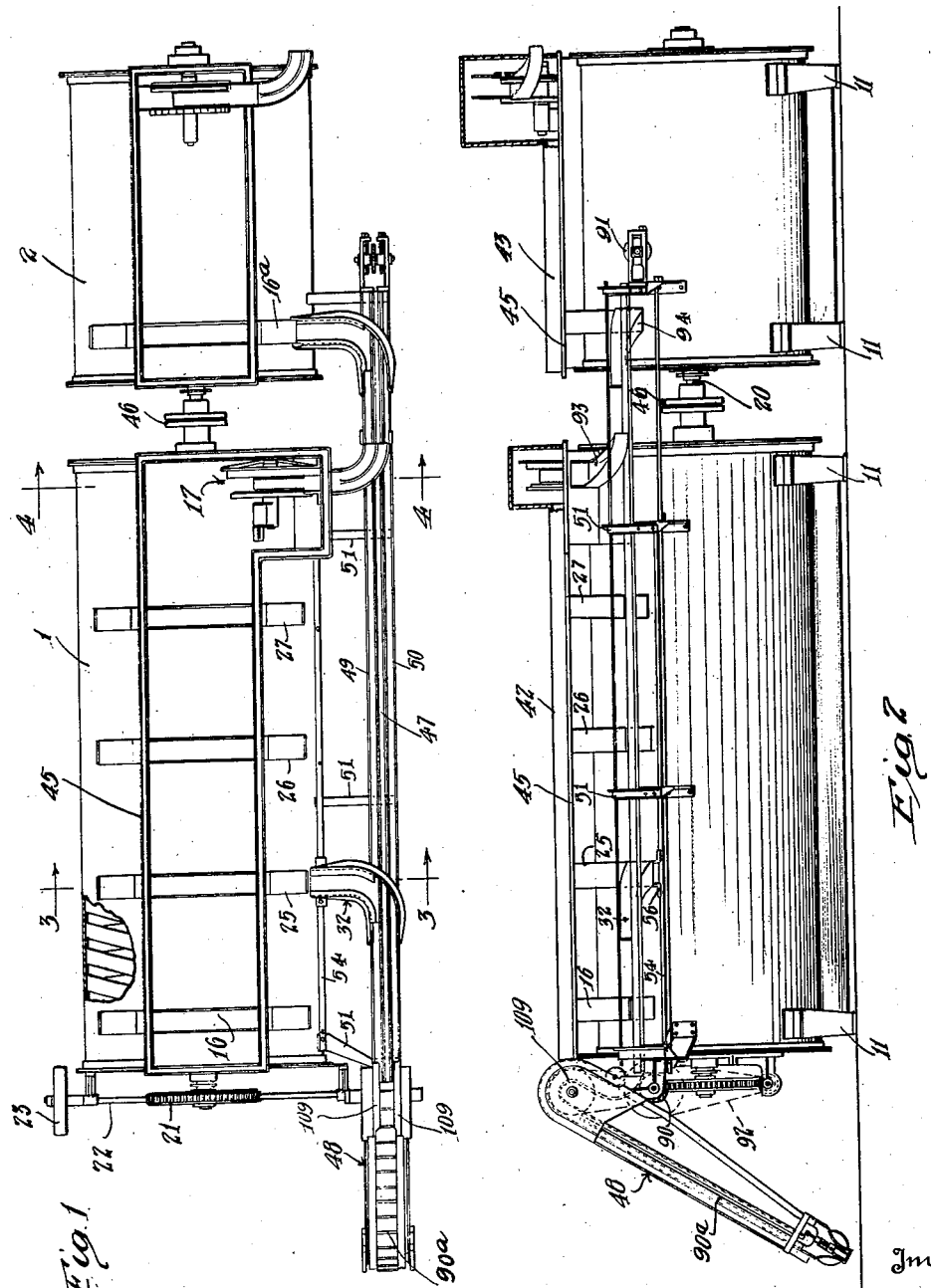

Sept. 20, 1932.  A. R. THOMPSON  1,878,025
COMBINED COOKER AND COOLER
Filed April 18, 1928  5 Sheets-Sheet 3
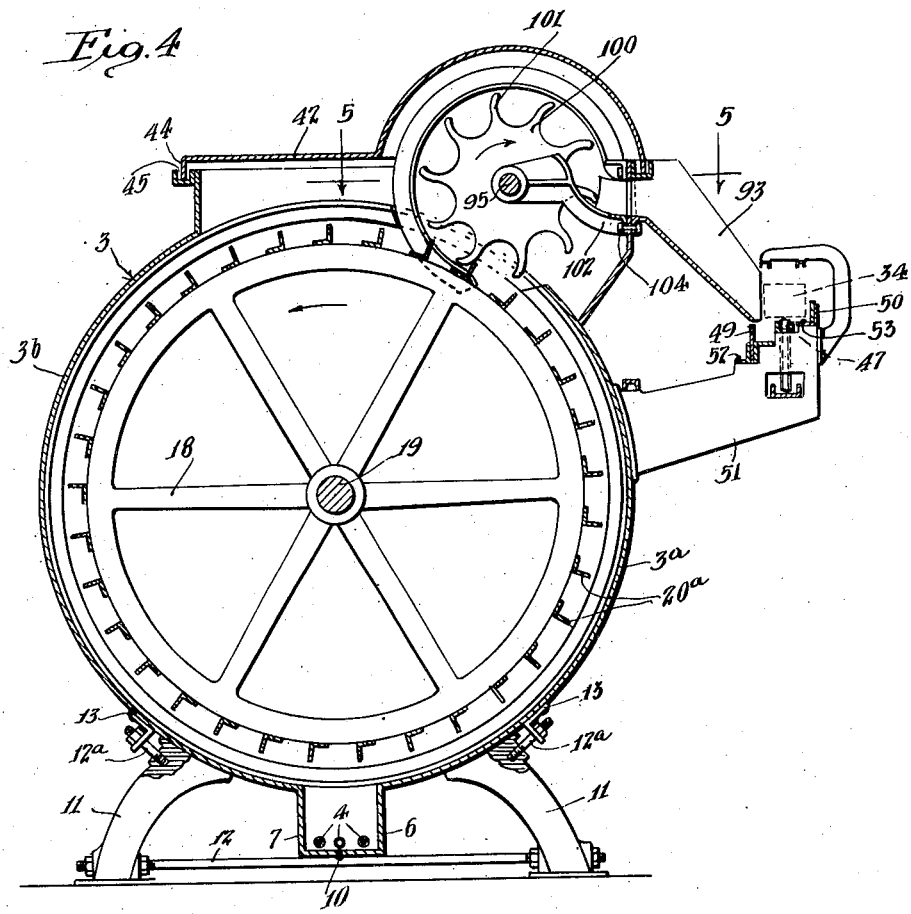
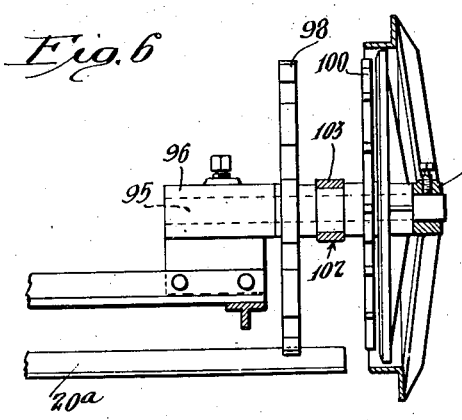
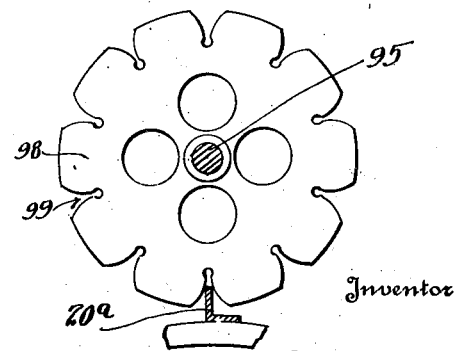
Inventor
Albert R. Thompson
By Lyon & Lyon
Attorneys

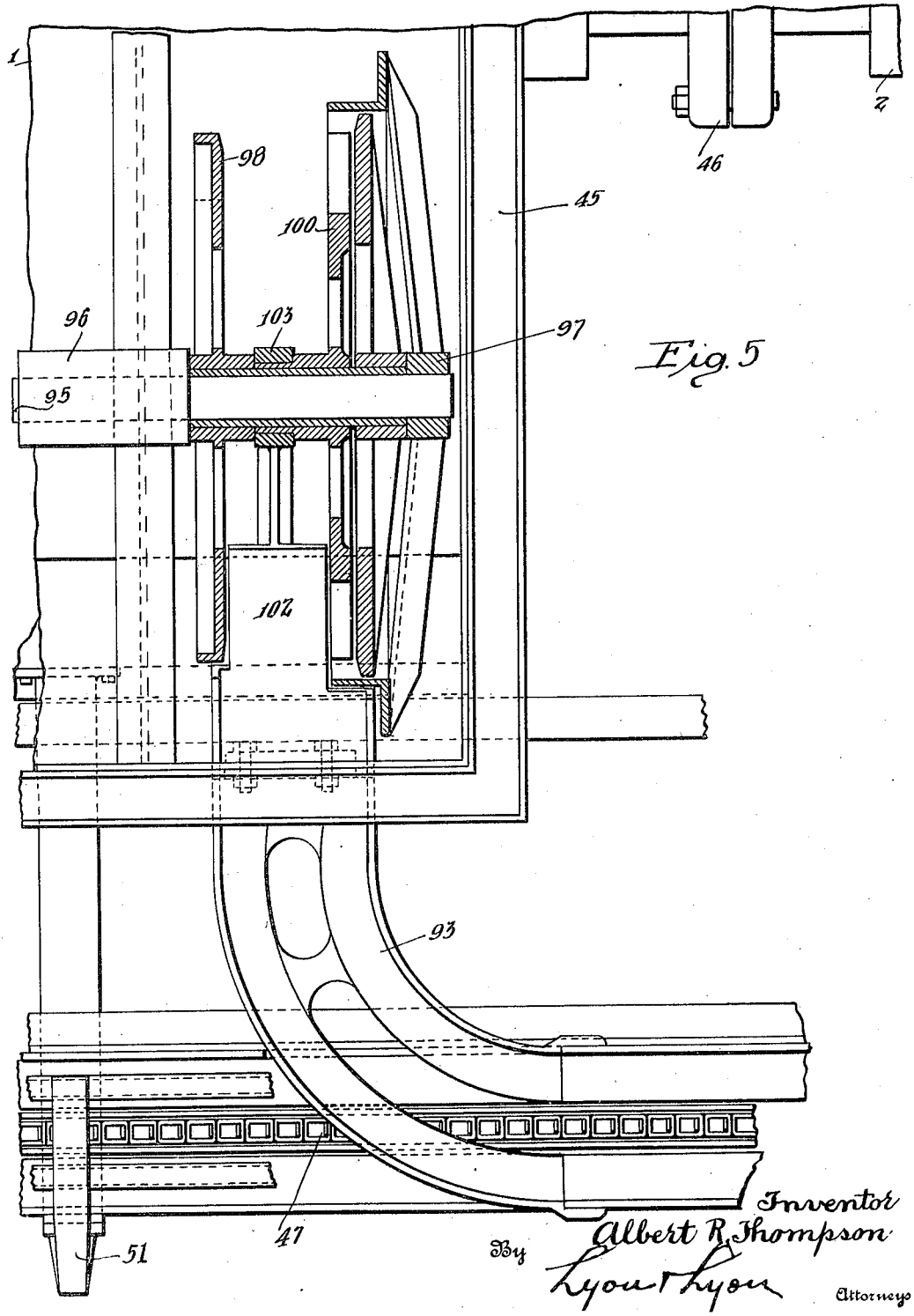

Sept. 20, 1932. A. R. THOMPSON 1,878,025
COMBINED COOKER AND COOLER
Filed April 18, 1928 5 Sheets-Sheet 5

Inventor
Albert R. Thompson
By Lyon & Lyon
Attorneys

Patented Sept. 20, 1932

1,878,025

UNITED STATES PATENT OFFICE

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA

COMBINED COOKER AND COOLER

Application filed April 18, 1928. Serial No. 271,070.

This invention relates to combined cookers and coolers and is more particularly related to an apparatus used in the canning art for what is known as the "final cook."

An object of this invention is to provide an apparatus for subjecting goods in cans, the cans having been previously hermetically sealed, to the final cook, the apparatus being of simple and effective structure, including means permitting an economic regulation of the times of cook; including means which are adapted to cause the cans to enter the cooker at any one of a multiplicity of entrances, the said means being slidably mounted upon a single conveyer for said cans which extends longitudinally of the apparatus, providing not only the conveyor along which the cans are caused to travel to the position of their inlets into the cooker, but a conveyor for handling the cans after the same are discharged from one chamber and conveying the same to the inlet of the subsequent chambers.

Another object of this invention is to provide a structure of treating chamber including a shell which is fluid tight and which is formed of half sections united together at the bottom at a rectangular section by welding the adjacent edges of the half sections together, the section of the shell at which the weld is effected being rectangular in cross section to permit the structure of the shell to yield at its bends, or corners, to allow an effective and easy weld to be made at the adjacent edges, and providing a chamber for the reception of steam or other gas pipes for admitting steam or other fluid into the chamber.

Another object of this invention is to provide a heat treating chamber for the processing of goods in cans which includes an inlet means through which the cans are admitted to the chamber in single file relation and means whereby cans entering said chamber at too great a speed so as to lie one over the other are automatically ejected from the chamber so as not to jam in the chamber.

Another object of this invention is to provide an improved form of means for ejecting the cans from the discharge end of one chamber and for conveying the same to the inlet of an adjacent chamber.

Another object of this invention is to provide an improved form of feed chute adapted to be slidably mounted in relation to a conveyor to permit the said chute to be moved to any one of a plurality of inlet openings of the treating chamber, the feed chute being provided with gates for arresting the travel of the cans through the chute into the opening and the transfer gate adapted to be lowered from the chute into any one of said can inlets to convey the cans into said inlet easily and without too great agitation of said cans.

Other objects and advantages of this invention it is believed will be apparent from the following detailed description of a preferred embodiment of this invention as illustrated in the accompanying drawings:

In the drawings:

Figure 1 is a top plan view of a canning apparatus embodying this invention.

Figure 2 is a side elevation thereof.

Figure 3 is an end sectional view taken substantially on the line 3—3 of Figure 1.

Figure 4 is an end sectional view taken substantially on the line 4—4 of Figure 1.

Figure 5 is a sectional plan view taken substantially on the line 5—5 of Figure 4 and enlarged.

Figure 6 is a fragmental elevation of the extractor mechanism embodied in this invention.

Figure 7 is a detached view of the driver disc included in the extractor means.

Figure 10 is a detached fragmental elevation showing the separation of the side plates of the conveyor to allow the proper positioning of the slidable chute.

Figure 8:
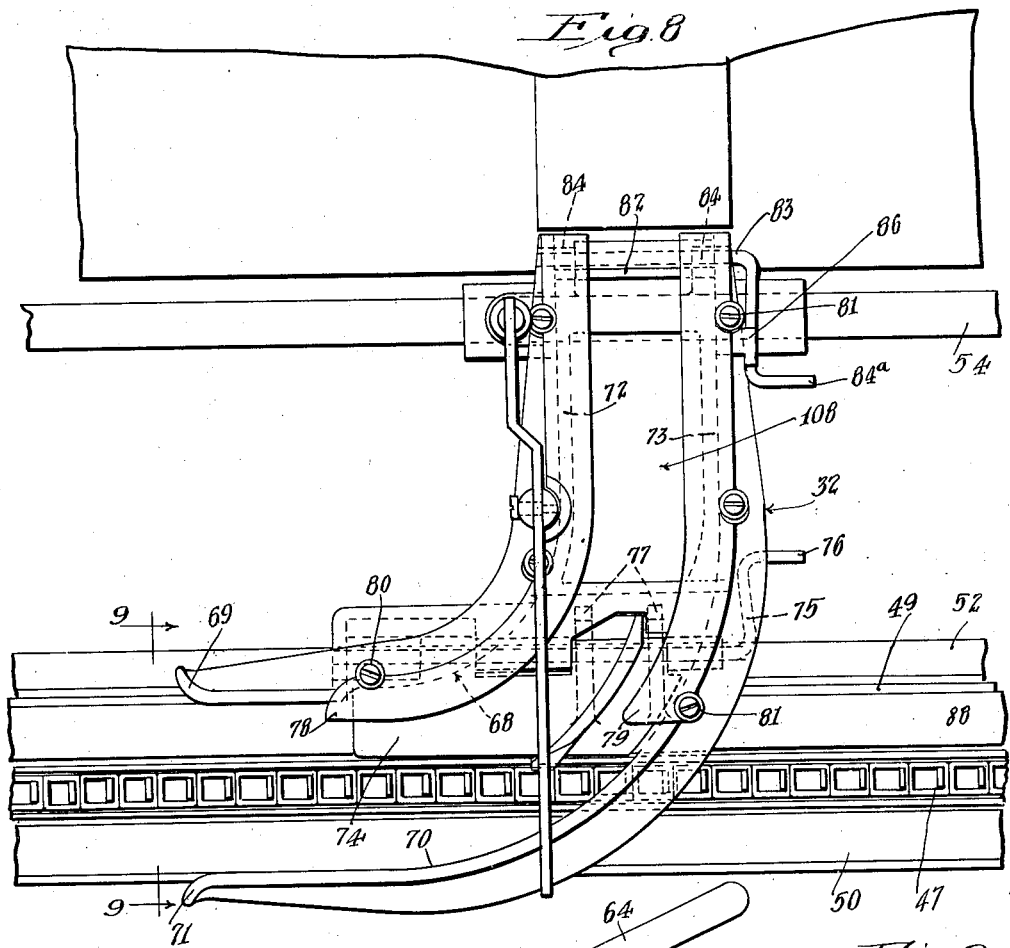
Figure 8 is an enlarged fragmental plan view of the movable chute embodied in this invention.
Figure 9:
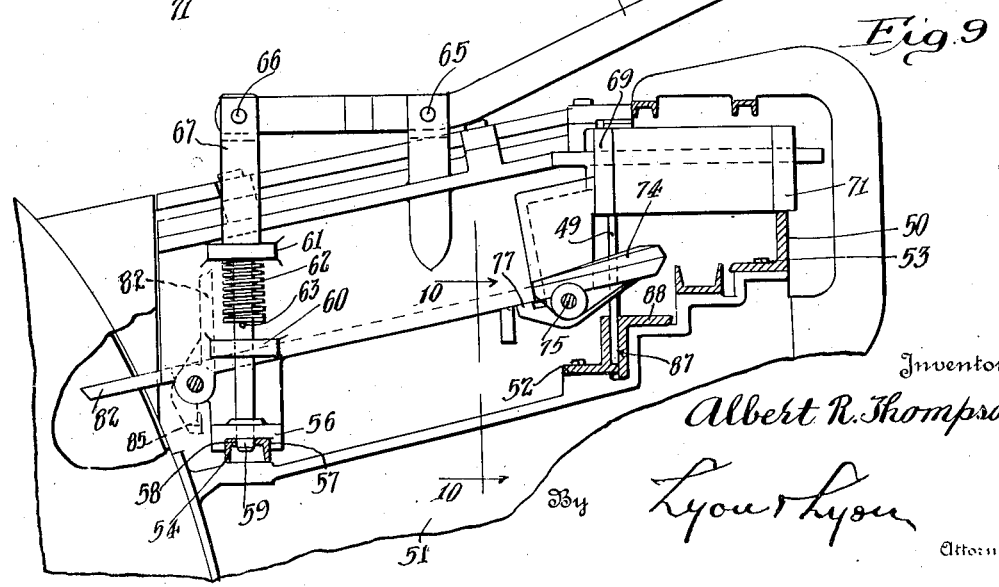
Figure 9 is an end sectional view taken substantially on the line 9—9 of Figure 8.

The preferred embodiment of this invention illustrated in the accompanying drawings, indicates what is commonly known in the art as a cooker, or treating chamber, into which cans which have previously been hermetically sealed are introduced to receive what is known as the "final cook". The cooker 1 may be operatively connected with a second cooker (not shown) of the same construction as the cooker 1, or may be connected directly with a cooler 2 as illustrated in Figures 1 and 2. The cooker 1 and the cooler 2 may be of substantially the same construction and each includes a shell 3 which is formed in half sections 3ª and 3ᵇ.

The shells 3 are usually of such size that it is impractical to construct the same of a single portion of material and it is required that these shells be fluid tight to retain the heated gas or steam which is admitted to their interior through any suitable means such as the steam pipes 4 which are mounted in the steam chamber 5 thereof. The cooler 2 is generally provided with no such steam pipes 4, but in some types of coolers it is desired to maintain substantially equal pressure within the shell of the cooler as within the shell of the cooker so that gas under pressure, usually cold, may be admitted through pipes similar to the pipes 4 mounted in a chamber similar to the chamber 5.

In order to unite the half sections 3ª and 3ᵇ in a simple and effective manner, and also in order to provide a chamber 5 for the pipes 4, I have found that if the shells are bent longitudinally to form substantially L-shaped sections 6 and 7, having bends 8 where the shell diverges from the cylindrical form, and also having a second substantially right-angled bend 9 where the adjacent edges 10 of the shells meet, that I am enabled to weld these adjacent edges 10 longitudinally of the structure to form a substantially one-piece shell which is fluid tight.

In welding these large structures, I have found that it is particularly necessary to form half sections of the shells with the bends 8 and 9 in order that there will be sufficient give to the shell sections 3ª and 3ᵇ at the bends 8 and 9 during the welding of their adjacent edges 10 to permit a uniform and fluid tight weld to be formed along this longitudinally extending seam, the principal difficulty being not to provide a connection between the edges 10 of the half sections 3ª and 3ᵇ but to form such a connection that the shell 3 provided will be fluid tight. The bends 8 and 9 permit welding of the half sections together without distorting the shell and causing it to bow from end to end.

In order to support the shell 3 I prefer to provide spaced legs 11 which are tied together by means of a tie-rod 12 to provide a supporting base. The legs 11 are adjustably secured to the shell 3 by means of bolts 12ª. The bolts 12ª are passed through angle plates 13 which are riveted to the shell 3 and are screw-threaded into the legs 11 as illustrated at 14. This type of leg structure is provided in order to permit the respective chambers of the apparatus to be correctly aligned so that the extracting means of one chamber may be correctly aligned with the transfer means for transferring the cans from one chamber to the next. This type of supporting means also provides a permanent and satisfactory support for these large shell chambers while also permitting the chambers to expand at their respective ends and contract as may be required by the temperature differentiations set up within their interior.

Spirally positioned within the interior of each shell is a track 15 formed of flanged irons which are bent spirally to conform to the interior curvature of the shell 3 and extend from the inlet 16 to the outlet 17 of each chamber. The runs of the spiral track 15 are spaced apart a distance substantially equal to the length of the can to be rolled through the track. The cans to be treated are caused to travel through the track thus formed by means of a reel 18 which is secured to the longitudinally extending shaft 19 of the cooker 1 and a similar reel is secured to the operating shaft 20 of the cooler 2. The reel 18 is formed of spaced wheels secured at spaced points along the shaft 19 and having flanged irons 20ª secured to their periphery in position to engage the cans and move the cans through the tracks 15.

The shaft 19 of the cooker 1 is driven from any suitable source of drive mechanism as is illustrated by the worm drive 21 which is driven from the shaft 22. The shaft 22 is driven by any suitable form of prime mover operatively connected with the drive pulley or sprocket 23.

To permit the cans to be admitted to the cooker 1 at a multiplicity of inlets in order that the time of cook may be varied in accordance with that required for the proper processing of the particular goods, or food products, contained within the cans, the cooker 1 is provided with a multiplicity of spaced inlets 16, 25, 26 and 27.

The cooler 2 is provided with an inlet 16ª which is similar to any one of the inlets 16, 25, 26 or 27 so that the construction of only one of these inlets will be described.

The shell 3 of the cooker 1 or cooler 2 is formed to provide these inlets as follows: The shells are provided with inlet openings such as are illustrated at the opening 16 in Figure 3 and this opening is provided with a cover plate 29 which inclines downwardly over the opening 16. Secured to the end of the plate 29 is a gate 30 which is pivoted at 31 to swing outwardly and permit the cans to roll through the opening 16 from the chute 32. The sides of the opening 16 are normally closed by plates 33 which are secured to the plate 29 at one edge and to the shell 3 at their opposite edges so that only when the door 30 is opened is there provided means by which the steam or other gas within the shell 3 can escape.

In order to prevent the cans 34 from entering the shell 3 to assume the position illustrated at 35 in Figure 3, the shell of the cooker is cut away as indicated at 36 to permit the can assuming this position to pass through the track 15 and through a similar opening 37 formed on the opposite half section 3$^a$ of the shell 3 until the same engages the edge 38 of the shell 3$^a$ at which time the can 34 which has been admitted into the shell 3 in the position 35 is ejected through a throwout door 39 which is pivotally secured as indicated at 40 to the section 41 of the shell 3$^a$.

In order to permit access to the interior of the shell 3, a cover 42 is provided for each cooker and a cover 43 for each cooler. Each of the covers 42 and 43 has a downwardly extending flange 44 which fits within a water-sealed trough 45 which is secured to and extends completely around the upper free ends of the half sections 3$^a$ and 3$^b$ of the shell 3. The trough 45 is preferably formed by bending the edges of the shell sections 3$^a$ and 3$^b$ upon themselves in substantially U-shape as illustrated in Figure 3.

In order to permit the operating mechanism of each of the chambers to be driven from a common source of power so that the same will at all times be operated in definite predetermined time relation, the shafts 19 and 20 of the cooker 1 and the cooler 2 are coupled together by a coupling means as illustrated at 46.

Extending longitudinally of the shells 3 is a conveyor 47 on to which the cans are placed by means of an elevator 48. The elevator 48 may be of any suitable or desirable construction, as is well understood in the art and forms no part of this invention. The cans 34, as delivered to the conveyor 47 by the elevator 48, travel along the conveyor 47 and are delivered to any one of the inlets 16, 25, 26 and 27, depending upon the position of the slidably mounted inclined chute 32. The chute 32 is slidably mounted upon the side plate 50 and channel bar 54 over the conveyor 47.

The plates 49 and 50 are secured to spaced brackets 51 as illustrated at 52 and 53 respectively. A channel bar 54 extends longitudinally of the cooker 1 and is supported in position by means of the brackets 51. The channel bar 54 provides a guide track for the inner end of the sliding chute 32. The chute 32 is formed with a guide shoe 56 having a guideway 57 formed therein in which the bar 54 fits. The bar 54 is provided at points adjacent the openings 16, 25, 26 and 27 with holes 58 into which the lock pin 59, carried by the chute 32, is adapted to fit the lock of the chute 32 in position adjacent the inlet to the cooker 1.

The lock pin 59 is slidably mounted in boss 60, preferably formed integral with the structure of the chute 32, and extends through the shoe 56. A second boss 61 is formed preferably integral with the chute 32 and a spring 62 is interposed between the boss 61 and a stop pin 63 passed through the lock pin 59. The spring 62 normally urges the pin 59 into position to pass through the hole 58 formed in the bar 54. A lever 64 is pivotally supported at 65 from the chute 32 and is pivotally secured at the pin 66 to the extension 67 of a lock pin 59.

The chute 32 is preferably formed as a casting and is provided with an inner curved wall 68 which terminates in a guide point 69 over the plate 49. The chute 32 is also formed with an outer curved wall 70 which terminates in a similar guide point 71 over the plate 50. The chute 32 is provided with guide tracks 72 and 73 upon its opposite sides over which the cans 34 roll from the conveyor 47 to the inlet of the cooker 1. A gate 74 is pivotally supported upon a pin 75 intermediate the rails 72 and 73 in the entrance end of the chute 32 and is adapted to be lowered into position adjacent the conveyor 47 when it is desired that the cans 34 should roll through the chute 32. When it is desired to prevent cans from further entering the inlet of the cooker 1, the gate 74 may be raised by rotating the crank 76 which is secured to the supporting pin 75 to which the gate 74 is secured. The gate 74 is provided with a pair of stops 77 which engage the under surface of the chute 32 to hold the gate 74 in proper position so that the cans will roll into the chute 32. The gates 74 and 82 are raised when moving the chute 32 from one inlet opening to another.

The conveyor thus provided includes parallel guide plates 49 and 50 which embrace substantially the lower half of the diameter of the cans being conveyed. The slidably mounted chute 32 includes guides 68 and 70 which overlie the parallel guide plates 49 and 50 and are disposed concentrically with respect to said guide plates 49 and 50. The guides 68 and 70 engage the cans at the upper half of their diameter to direct said cans into the chute 32 and hence into the cooker.

In order to prevent the cans 34 from jumping out of the chute 32, cover guides 78 and 79 are secured to the walls 68 and 70 at the bosses 80 and 81 respectively.

Means are provided at the inner end of the chute 32 for easing the cans into the inlets of the cooker 1, which means preferably includes a gate 82 which is pivotally supported on a crank pin 83. The crank pin 83 extends through bosses 84 formed integral with the chute 32 and the crank pin 83 is bent to form a crank 84$^a$ by means of which the gate 82 is rotated to and from the position to transfer the cans through the inlets into the cooker 1. The gate 82 is provided with stops 85 which engage the under surface of the chute 32 to hold the gate 82 in proper position. A friction lock provided by the serrated surface 86 is formed on the chute 32 to lock crank 84ª in position to hold the gate 82 from oscillating as the cans travel over the same into the opening or inlet of the treating chamber.

In order to provide a continuous runway for the cans, no matter what position the chute 32 occupies, the inrail 49 is formed in sections which are of lengths corresponding to the distance between the openings or inlets 25, 26 and 27 and these sections are slidably mounted in the guideways 87 provided by the bar angle iron 88 and the angle iron 52. The sections of the plate 49 are of insufficient length to entirely fill the conveyor between said inlets so that when the chute 32 is moved to any position the sections of the plate 49 are slid to provide an opening through the plate 49 through which the cans 34 may roll on to the chute 32 and in this position the plates 49 provide a side plate for the entire remainder of the conveyor 47.

The conveyor 47 is preferably formed of a plain smooth chain which is treated over a drive sprocket 90 at one end and over an idler sprocket 91 at the opposite end. The sprocket 90 may be driven from any suitable or desirable source such, for example, as by means of a drive connection diagrammatically illustrated at 92 from the shaft 22. The conveyor 47 extends longitudinally of the cooker to provide a conveyor for transferring the cans from the discharge chute 93 to the inlet chute 94 through which the cans are admitted through the inlet 28 to the cooker 2.

In order to provide means for extracting the cans from the cooker 1, the following means are preferably provided: Mounted on a shaft 95 and journaled bearings in 96 and 97 secured to the shell of the cooker 1 is a drive disc 98. The drive disc 98 has spaced recesses formed around its periphery in position to be engaged by the angle irons 20ª of the reel 18. The angle irons 20ª engage within the recesses 99 causing the disc 98 to revolve and drive the extracting means. Operatively connected with the drive disc 98 is an extractor disc 100, fingers 101 being formed around its periphery, the fingers 101 being formed to grip the cans 34 and extract the same from within the cooker 1 and transfer the said cans to a guideway 102 down which the cans travel to the chute 93 to the conveyor 47.

The guide 102 forms, in addition to a guide, an extractor for extracting the cans 34 from between the fingers 101 and is mounted between the drive disc 98 and the extractor disc 100 by having its hub 103 journaled on the shaft 95. The outer end of the guide 102 is secured to the shell 3 of the cooker 1 as illustrated at 104.

The inlet chute 94, by means of which the cans are directed from the conveyor 47 into the inlet of the cooler 2, may be of any suitable or desirable form of construction and is preferably of the same construction as the chute 32.

In order to gently place the cans on the conveyor 47 and to positively discharge the cans from the elevator 48, the cans as elevated by the conveyor 90ª of the elevator 48 engage spaced curved guides 109 which extends from the top of the conveyor 90ª to the runway of the conveyor 47. In addition to gently placing the cans on the runway the guides 109 also positively discharge the cans due to the curvature of the guides 109 and the guides 109 at their inner sides extend over the conveyor 90ª.

After passing through the cooler 2 the cans are extracted from the cooler 2 by extractor means similar to the extractor 17 heretofore described and the cans are then ready for further processing, or packing, as the case may be.

The chute 32 is formed to provide a dropout opening 108 through which cans 34 which become turned will drop out of the chute 32 and not pass into the chamber out of position.

Having fully described my invention, it is to be understood that I do not wish to be limited to the details herein set forth, but my invention is of the scope of the appended claims.

I claim:

1. In a device of the class described, the combination of a plurality of chambers, one of which is provided with a plurality of inlet openings and an outlet opening, a track formed longitudinally of said chambers, a curved chute slidably mounted on said track to permit its positioning in register with any one of said inlet openings, and said chute including a pivotally mounted switch gate and a pivotally mounted drop in gate adapted to be dropped into the said opening in which the chute is positioned in register.

2. In combination with a treating chamber for canned goods, said chamber including a plurality of inlet openings, of a track formed of spaced side plates, a conveyor operatively positioned between said side plates, a curved chute slidably mounted on said side plates and the side plate adjacent said chamber being formed in sections to permit the same to be moved apart and provide an opening through which the cans are conveyed on said chute from said conveyor to any one of said openings, the sections when so moved forming a continuous side plate for the remainder of said track.

3. In a device of the class described, the combination of treating chamber shell, having ing an inlet opening, a chute adapted to feed cans into said chamber through said opening, means within said shell for conveying the cans in single file relation, an outlet from the said shell spaced from said inlet and means for causing a can as conveyed by said conveying means in superposed position out of single file relation to be ejected through said outlet.

4. In a device of the class described, the combination of a treating chamber shell having an inlet opening, a chute adapted to feed cans into said chamber through said opening, means within said shell for conveying the cans in single file relation, an outlet from said shell spaced from said inlet, means for causing the cans as conveyed by said conveying means in superposed position out of single file relation to be ejected from said shell through the outlet, and a cover normally closing said outlet.

5. In a device of the class described, the combination of a chamber having a plurality of inlet openings and an outlet opening, a track formed longitudinally of said chamber, a curved inclined chute slidably mounted on said track to permit its position in register with any one of said inlet openings, and said chute including a pivotally mounted gate adapted to be dropped into said opening in register with which the chute has been positioned.

6. In a device of the class described, the combination with a heat treating chamber having a track extending therethrough and a plurality of inlet openings, of a curved inclined chute including means for slidably supporting the chute on the track, lock means for locking the chute in register with any one of said inlet openings, a pivotally mounted switch gate, and a pivotally mounted drop in gate adapted to be lowered into the chamber through any one of said inlet openings.

7. In a device of the class described the combination of a conveyor including opposite guide plates, the side plates extending upwardly a distance of substantially one half the diameter of the cans traveling said conveyor, a curved chute associated with said conveyor and provided with curved inner and outer guides adapted to engage the upper half of the cans on said conveyor to direct the cans off the conveyor into the inclined chute.

8. In a device of the class described, the combination of a cooker, a conveyor including parallel guide rails embracing substantially the lower half diameter of the cans being conveyed, a chute slidably mounted on said conveyor, the chute having concentric guides overlying the parallel guide rails adapted to engage the upper half diameter of the cans and direct them off the conveyor into the cooker in rolling relation.

9. In a device of the class described, the combination of a cooker, a conveyor including parallel guide rails embracing substantially the lower half diameter of the cans being conveyed, a chute slidably mounted on said conveyor, the chute having concentric guides overlying the parallel guide rails adapted to engage the upper half diameter of the cans and direct them off the conveyor into the cooker in rolling relation, and parallel cover rails overlying the concentric guides to hold the cans from being forced out of said conveyor.

10. In a device of the class described, the combination of a shell having a helical track formed on its inner periphery, means within the shell for advancing the cans along said track, and an extractor mounted at the end of said track for lifting the cans out of said chamber, the extractor including a driven disc operably engaged by the can advancing means to drive the extractor, a pick-up disc operably connected with the driven disc and adapted to cooperate with the driven disc in picking the cans from the helical track, the said driven and pick-up disc being journaled upon a shaft, a combined guide and extractor member mounted on the shaft and secured from rotation and interposed between the driven and pick-up discs for removing cans from between the driven and pick-up discs and guiding the same away from said shell.

11. In a device of the class described, the combination of a cooker and cooler, a conveyor extending longitudinally of the cooker and cooler and being disposed above the axis of the reels thereof throughout its length, an inlet chute associated with the conveyor for directing cans from the conveyor into the inlet of the cooker, a discharge chute associated with the conveyor for directing cans from the discharge of the cooker onto the conveyor, and an inlet chute associated with the conveyor for directing the cans from the conveyor to the inlet of the cooler.

12. In combination, a cooker and cooler having a reel and spiral disposed therein for conveying cans therethrough, a horizontal conveyor extending longitudinally of said cooker and cooler and disposed above the center of rotation of said reels, and chutes associated with said conveyor for feeding cans thereto and receiving cans therefrom, and means for driving said reels and conveyor.

Signed at San Jose, California, this 5th day of April, 1928.

ALBERT R. THOMPSON.